United States Patent [19]
Grutter et al.

[11] Patent Number: 5,159,810
[45] Date of Patent: Nov. 3, 1992

[54] CATALYTIC CONVERTER MONITORING USING DOWNSTREAM OXYGEN SENSOR

[75] Inventors: Peter J. Grutter, Livonia; Gerald G. Stock, Whitmore Lake; John A. Cushing, Taylor; Alexander Y. Gopp, Ann Arbor, all of Mich.

[73] Assignee: Ford Motor Company, Dearborn, Mich.

[21] Appl. No.: 750,173

[22] Filed: Aug. 26, 1991

[51] Int. Cl.[5] .............................................. F01N 2/20
[52] U.S. Cl. ...................................... 60/274; 60/276; 60/277; 60/285; 123/691
[58] Field of Search ............... 60/274, 276, 277, 285; 123/691

[56] References Cited

U.S. PATENT DOCUMENTS 3,969,932  7/1976  Rieger ................................. 60/277
4,007,589  2/1977  Neidhard et al. .
4,622,809  11/1986  Abthoff et al. .

Primary Examiner—Douglas Hart
Attorney, Agent, or Firm—Peter Abolins; Roger L. May

[57] ABSTRACT

An exhaust gas oxygen sensor downstream of a catalytic converter is used to control a closed loop air/fuel ratio control system. A measured limit cycle frequency at various engine speed/load conditions is compared to stored benchmark limit cycle frequencies as functions of engine speed/load conditions. If the measured frequency is higher, the catalytic converter is considered to be degraded.

11 Claims, 4 Drawing Sheets

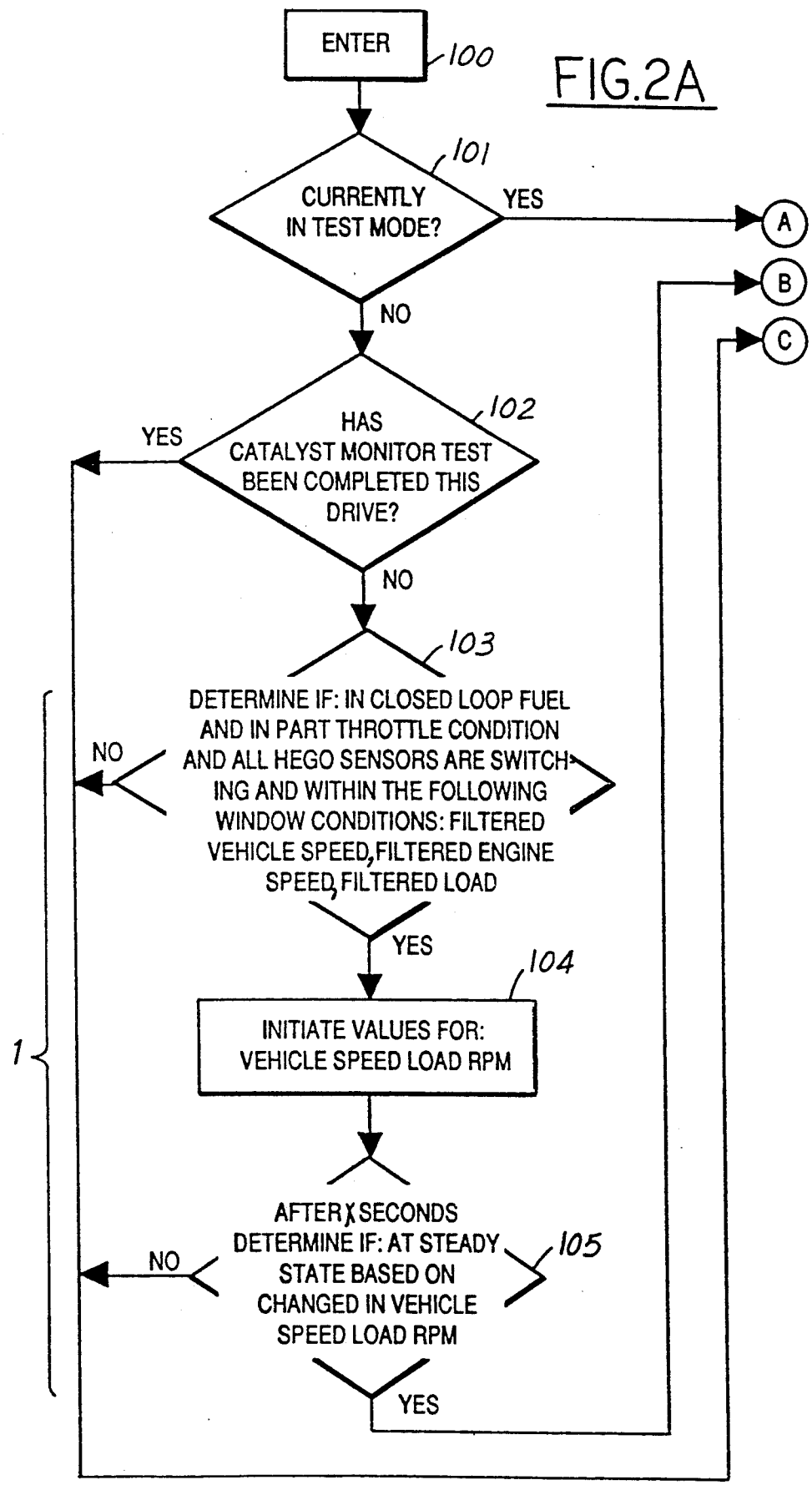

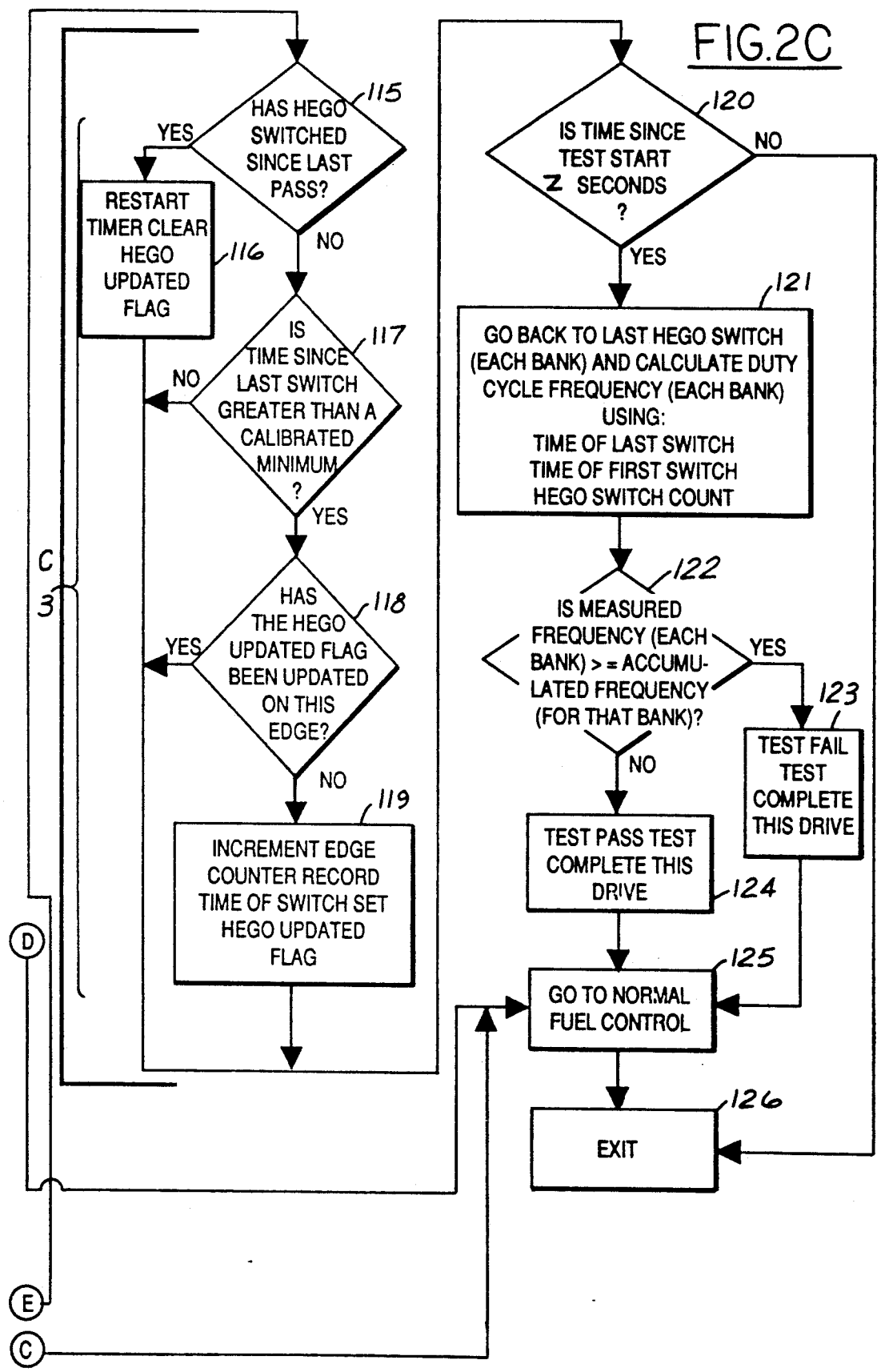

CATALYTIC CONVERTER MONITORING USING DOWNSTREAM OXYGEN SENSOR

BACKGROUND OF THE INVENTION

1. Field of the Invention

This invention relates to emission control of internal combustion engines. In particular, the invention relates to on-board monitoring of the efficiency of a catalytic converter installed on a vehicle to minimize emission from an engine.

2. Prior Art

It is known in the field that catalyst conversion relates to the oxygen storage capability of a catalytic converter. A properly operating catalyst dampens oxygen concentration fluctuations in the exhaust stream. One proposed system (see SAE paper 900062, Detection of catalytic converter efficiency loss using on-board diagnostic) employs two exhaust gas oxygen sensors (EGO), one before and one after the catalytic converter, to detect those changes in oxygen content before and after the catalytic converter. The system further employs test signals in a form of an air/fuel ratio swing on both sides of stoichiometry at predetermined rates or frequencies caused by fuel control system perturbations. By comparing the change in response patterns between pre- and post-catalytic converter EGO sensors, a determination can be made about catalytic converter efficiency. A deficiency of that method is that a fuel control system during test operates in an open loop, and air/fuel ratio tends to shift from stoichiometry. Test results also depend on two EGO sensors which may have different characteristics due to manufacturing tolerances or aging which may lead to additional errors. In particular, aging-. of the upstream EGO sensor can be very pronounced. Further, selected air/fuel ratio swing and frequency greatly influence results of the test.

SUMMARY OF THE INVENTION

A procedure for on-board monitoring of the hydrocarbon efficiency of a vehicle catalytic converter measures the limit. cycle frequency of the vehicle feedback fuel control system when controlled by an EGO sensor downstream of the catalytic converter.

As is known, limit cycle is used to describe the feedback operation of the feedback air/fuel ratio control system for an engine. More specifically, when an exhaust gas oxygen sensor switches from an indication of a rich air/fuel ratio to an indication of a lean air/fuel ratio the system is driven by a rich air/fuel ratio again by reducing the amount of air with respect to the amount of fuel. When the exhaust gas oxygen sensor then switches to an indication of a rich fuel ratio, the system is driven lean by increasing the amount of air with respect to the amount of fuel. System operation between the switching points of the exhaust gas oxygen sensor wherein the system air/fuel ratio is driven successively rich, lean, rich, lean, etc. is termined the limit cycle.

Features of this method include: 1) using the downstream EGO to control the feedback fuel control system during the catalytic converter monitor test and 2) comparing the limit cycle frequency measured during the test to a calculation of the maximum acceptable frequency based on the speed load conditions encountered during the test. Advantageously, the method also includes software sequencing ensuring limits on fluctuations of vehicle operating conditions, stabilization under rear EGO control and actual monitoring to determine whether the measured frequency is within the designated limits. Additionally, software rationalizes data to filter out erroneous EGO switching, termed buzz, due to cylinder to cylinder air/fuel maldistribution.

Advantages of this method include: 1) testing a characteristic directly related to oxygen storage, 2) compensating for changes in engine speed and load conditions, 3) ensuring that testing conditions are maintained during tests, 4) eliminating false EGO switches attributable to cylinder to cylinder maldistribution, and 5) using, during the catalytic converter monitoring test, EGO sensors located behind and protected by the catalystic converter, thereby eliminating errors due to differential aging of the EGO sensors located before and after the catalytic converter. These features ensure the accuracy and reliability of the test.

Measurement of the frequency of the fuel system limit cycle when under control of the downstream EGO sensors, is an indirect measurement of the oxygen storage capacity of the catalytic converter. This method is actually measuring the period it takes the fuel control system to drive the catalytic converter system lean when the EGO sensor observes a rich condition and then the period it takes the fuel control system to force the catalytic converter system rich when the EGO sensor signal observes a lean condition. The resultant frequency referred to as the "rear EGO frequency" is inversely related to the oxygen storage capacity of the catalytic converter, which through testing, has been shown to be a function of the catalytic converter hydrocarbon efficiency for that vehicle emission system. Use of this characteristic directly related to oxygen storage improves the quality of the test results.

BRIEF DESCRIPTION OF THE DRAWINGS

FIGS. 2A, 2B and 2C are flow charts of a catalytic converter monitor test in accordance with an embodiment of this invention.

DETAILED DESCRIPTION OF THE INVENTION

This invention detects lowered catalytic converter efficiency indirectly, by measuring a catalytic converter characteristic which is related to hydrocarbon conversion (HC) efficiency, and can serve as an indicator of lowered catalytic converter efficiency. This measured parameter is the oxygen storage capability of the catalytic converter. Federal Test Procedure (FTP) vehicle emission tests demonstrate that catalytic converters with greater oxygen storage capacity, as measured by a rear EGO frequency method, have higher hydrocarbon efficiency during the FTP.

Figure 1:
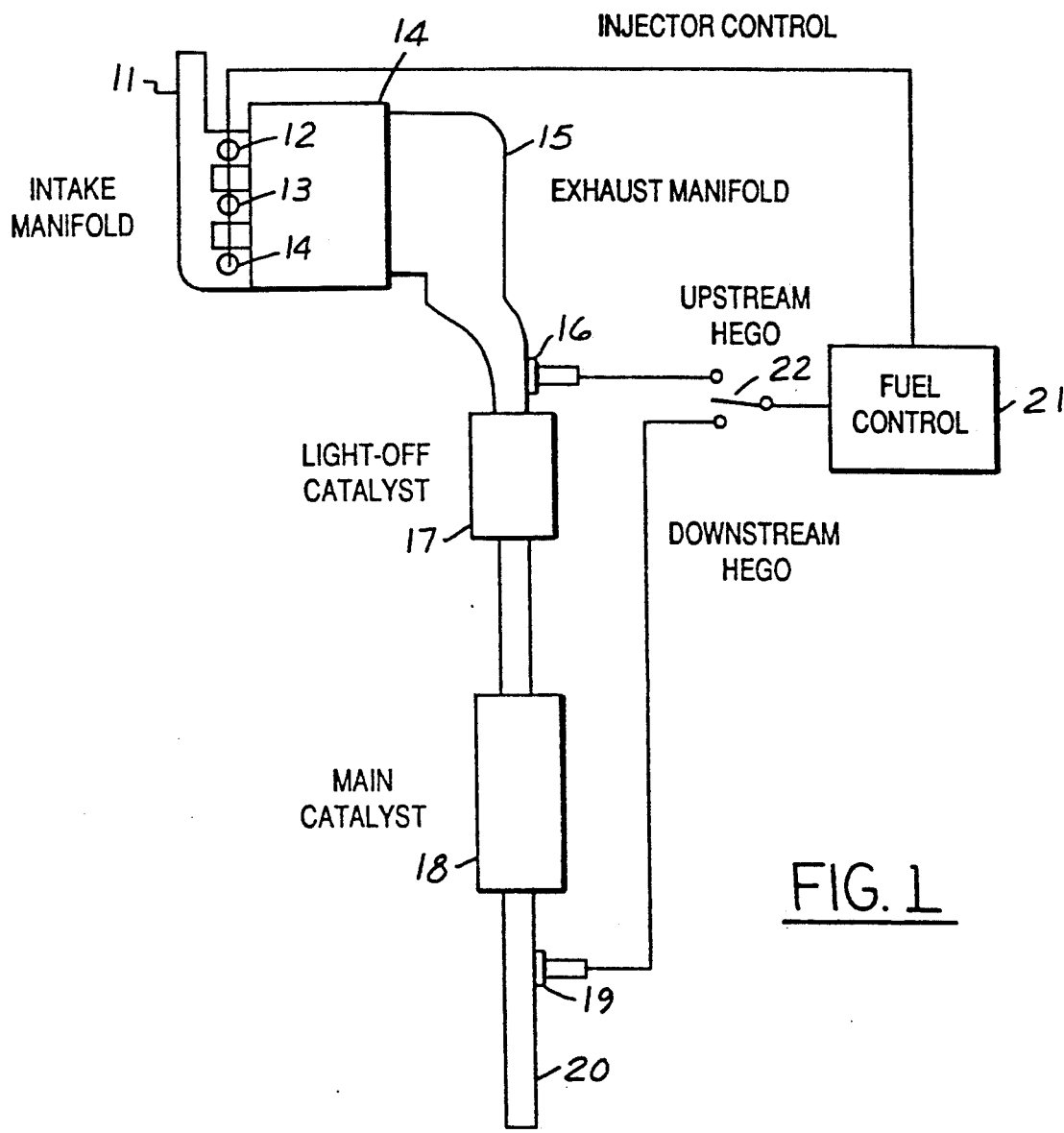
FIG. 1 is a schematic diagram of an internal combustion engine with a catalyst having an upstream exhaust oxygen sensor and a downstream exhaust oxygen sensor coupled to a fuel control module for controlling a air fuel ratio of the engine.

According to FIG. 1, an engine 10 has an associated intake manifold 11 with fuel injectors 12, 13, and 14. An exhaust manifold 15 takes exhaust gas from the engine and passes it past an upstream EGO sensor 16, a light off catalytic converter 17, a main catalytic converter 18, and a downstream EGO sensor 19 to an exhaust pipe 20. A fuel control module 21 is connected through a switch 22 to upstream EGO 16 and to downstream EGO 19.

An output from fuel control module 21 is coupled to injectors 12, 13 and 14.

The reason that an active catalytic converter (one with high HC conversion efficiency) has a lower frequency during this test than a less active catalytic converter is based on oxygen storage. An active catalytic converter is able to store a finite amount of oxygen under lean A/F (air to fuel ratio mixture) conditions, and use the stored oxygen to react with the rich A/F mixture when it arrives. Monitored from the EGO sensor downstream of the catalytic converter, the oxygen storage capacity of the catalytic converter is measured as the time delay it takes to force the catalytic converter system rich (deplete the stored oxygen) once a lean condition is observed; and conversely to force the fuel system lean (fill all the oxygen storage sites) once a rich condition is observed.

By using the EGO sensor downstream of the catalytic converter to control the air/fuel ratio, total system delays are measured by recording the frequency of the fuel system limit cycle. Therefore, a comparison of the measured frequency of one catalytic converter to another, is a comparison of the oxygen storage capacity of the catalytic converters.

Figure 2B:
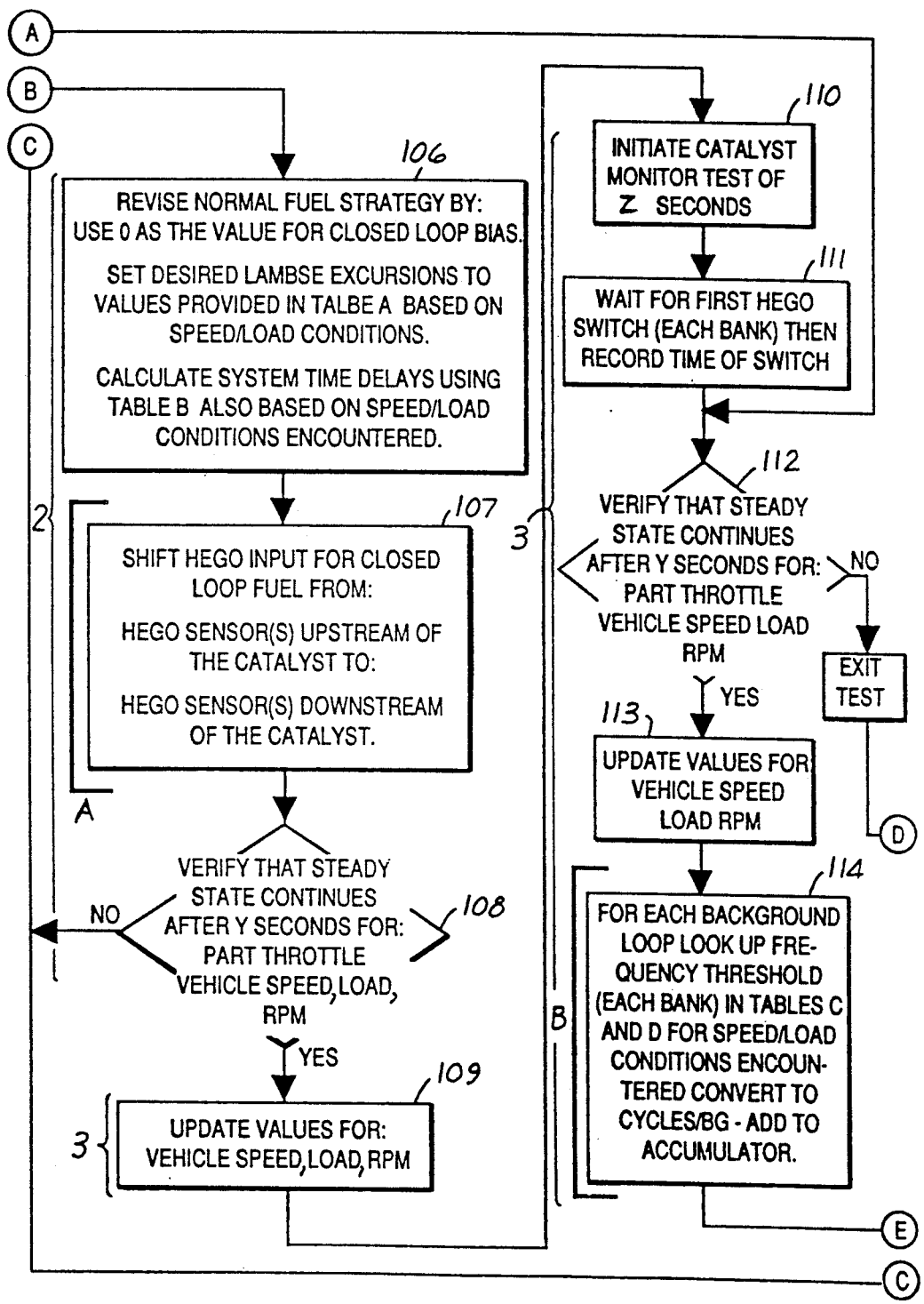

A flow chart of the software algorithm used to monitor the catalytic converter and ensure that fluctuations of vehicle operating conditions are within desired limits throughout the tested period is provided in FIGS. 2a, 2B and 2C. This procedure utilizes oxygen sensors installed upstream and downstream of the catalytic converter, and performs the measurement by transferring (via software) control of the fuel feedback loop from the EGO sensor upstream of the catalytic converter to the EGO sensor downstream of the catalytic converter. After a short stabilizing period, the limit cycle frequency of the modified fuel feedback system is measured. Simultaneously, a time weighted calculation of maximum allowable frequency for an acceptable catalytic converter is performed based on the engine speed and load conditions encountered during the measuring period. The actual determination of whether a catalytic converter has an acceptable level of oxygen storage is made by comparing the measured frequency of the limit cycle and the calculated maximum allowable frequency. A measured frequency larger than the calculated maximum allowable frequency results in failure of the catalytic converter test.

More specifically, changes to engine speed and load conditions impact the frequency of the limit cycle control. Therefore the threshold at which a catalytic converter is either acceptable or unacceptable must be adjusted accordingly. This adjustment is made using a calibration table with x and y coordinates of engine speed and load. The values in the table for each engine speed and load coordinate are values of maximum allowable frequency for an acceptable catalytic converter. This calibration table is developed by mapping data for both a marginally acceptable catalytic converter and a marginally unacceptable catalytic converter under all engine speed and load conditions used during the catalytic converter monitor test. Values half way between the frequencies mapped for both catalytic converters are entered into the tables values.

During the catalytic converter monitor test, the engine control computer looks up, for each asynchronous variable time period, i.e., a background loop, the value in the table for the engine speed and load conditions encountered. Throughout the test a time weighted average of frequency is calculated. In particular, fractions of a limit cycle which elapse during each asynchronous variable time period are accumulated over the entire test duration to form the time weighted average. This represents the maximum allowable frequency for the tested period. This calculated frequency is then compared to a rear EGO frequency measured during this same test period to determine if the catalytic converter tested has acceptable levels of oxygen storage. Compensation for engine speed and load conditions encountered enable successful testing over a wider range of engine conditions.

To complete the catalytic converter monitor test, the software must progress through four distinct phases. During any of the first three phases, should vehicle conditions exceed acceptable test conditions the software will exit the test and restart again once acceptable test conditions are experienced. Phases (illustrated on FIGS. 2A, 2B and 2C, the software flow diagram) include: 1) a short period to ensure the fluctuations of vehicle operating conditions are within desired limits, 2) a transition period in which the vehicle fuel control is switched to rear EGO control and the vehicle is allowed to stabilize, and 3) the monitor period in which both the actual limit cycle frequency is measured and a calculation of the maximum allowable frequency based on speed load conditions during the test is performed. During phase 4) a comparison of the actual frequency and the calculated frequency is made to determine whether the catalytic converter efficiency is above or below an acceptance threshold. This software feature ensures testing is conducted only when conditions are correct for quality test results.

Erroneous EGO switching (buzz) due to cylinder to cylinder maldistribution is filtered out using software. An algorithm rationalizes the period between EGO sensor switches by ignoring switches without the normal bounds of a catalytic converter system and within the bounds of maldistribution buzz. This algorithm is implemented in the step of the FIG. 2C flow chart at bracket C.

Referring to FIG. 2A, the catalytic converter monitor test logic flow begins at a block 100 where the flow is entered. At decision block 101 it is asked whether there is currently a test mode in effect. If not, logic flow goes to decision block 102 where it is asked if the catalytic converter monitor test has been completed on this trip. If not, logic flow goes to a decision block 103 where it is determined if in closed loop fuel and in part throttle condition and all EGO sensors are switching and within window conditions defining upper and lower bounds for each of the following parameters: vehicle speed, engine speed and engine load. If these conditions are met, logic flow goes to block 104 wherein values are initiated for vehicle speed, engine load and engine speed. Logic flow then goes to a decision block 105 where it is decided after a predetermined number of seconds (x) if fluctuations in vehicle operation conditions are within desired limits, based on changes in vehicle speed, engine load and engine speed. If yes, logic flow goes to a block 106 wherein a predetermined fuel control strategy is used incorporating a selected bias amount, jumpback amount and ramp rate for the air/fuel control. This is done to get a known operating point and improve resolution of catalytic converter efficiency test results. System time delays are calculated using Table B also based on the speed load conditions encountered.

Logic flow then goes to a block 107 wherein the EGO input for closed loop fuel control is shifted from the upstream EGO sensors to EGO sensors downstream from the catalytic converter. This ensures that the air/fuel mixture is controlled using only the rear exhaust gas oxygen sensor to determine catalytic converter activity. From block 107 logic flow goes to a decision block 108 where it is verified that fluctuations in vehicle operating conditions are within desired limits after a predetermined number of seconds for a part throttle vehicle speed, engine load and engine speed. If yes, logic flow goes to a block 109 wherein the values for vehicle speed, engine load and engine speed are updated. Logic flow continues to a block 110 where there is initiated a catalytic converter monitor test of a predetermined number of seconds. Logic flow continues to a block 111 where the time of the first EGO switch for each bank is recorded. Logic flow then goes to a decision block 112 wherein it is verified that fluctuations in vehicle operating conditions continue to be within desired limits after y seconds after a pre-determined number of seconds for engine operating parameters including throttle position, vehicle speed, engine load and engine speed.

Back at logic block 101, if it was determined that operation currently was in the test mode, logic flowed directly to block 112. Logic flow from decision block 112 goes to a block 113 if fluctuations in vehicle operating conditions are within desired limits. At block 113 the values for vehicle speed, engine load and engine speed are updated. Logic flow then continues to block 114 wherein a threshold frequency for each bank is calculated for this background ("BD") loop using Tables C and D. Alternatively, it may be desirable to sample the stored frequencies at fixed time intervals. Thus a fixed or variable sampling rate may be used. Tables C and D (one for each bank, if an engine with more than one bank is used) contain the threshold frequencies as functions of engine speed and engine load. This allows catalytic converter monitoring over a wide range of closed loop fuel speed/load conditions. Logic flow then continues to a decision block 115 wherein it is questioned whether the EGO has switched since the last pass. If yes, logic flow goes to a block 116 wherein a timer is restarted and an indicating flag is updated. If no, logic flow goes to a decision block 117 where it is asked if the time since the last switch is greater than a calibrated minimum. If the answer is yes, logic flow goes to a decision block 118 where it is asked if the EGO updated flag has been updated on this edge, where an edge indicates a transition of an EGO sensor output between a high output and a low output caused by a switch between rich and lean. If no, logic flow goes to a block 119 where it is determined to increment the edge counter, record time of switch and set the EGO updated flag.

Logic flow then goes to a decision block 120 where it is asked if the time since the start of the test is a predetermined number of seconds. If no, logic flow goes to an exit block 126. If yes, logic flow goes to a block 121 wherein it is determined that you go back to the last EGO switch, each bank, and calculate the duty cycle frequency, each bank, using time of last switch, time of first switch, and the EGO switch count. Logic flow then goes to a decision block 122 wherein it is checked if the measured frequency is greater or equal to the accumulated frequency. If yes, logic flow goes to a block 123 where it is determined that the test fails and the test is complete this try. Logic flow from block 123 goes to a block 125 wherein normal fuel control is used.

If at block 122 it is decided that the measured frequency is not greater or equal to the accumulated frequency for that bank, then the test is passed and logic flow goes to a block 124 wherein the test is passed and the test completed this try. Logic flow from block 124 goes to block 125 indicating going to a normal fuel control. Logic flow also goes to block 125 from decision block 112 if vehicle operating conditions are not within desired limits after a predetermined number of seconds for vehicle conditions including throttle position, vehicle speed, engine load, and engine speed. Also, logic flow goes to block 125 from a NO decision at block 108, a NO decision at block 105, a NO decision at block 103 and a YES decision at block 102.

Particularly advantageous features of an embodiment of this invention are highlighted by lettered brackets A, B, and C in FIGS. 2B and 2C. "A" is the feature which controls the air/fuel mixture using only the downstream catalytic converter to determine catalytic converter activity. "B" is the feature which allows catalytic converter monitoring over a wide range of closed loop fuel speed and load conditions. "C" is the feature which filters out erroneous EGO switching, i.e., buzz, due to maldistribution of fuel among cylinders.

Various modification and variations will no doubt occur to those skilled in the art to which this invention pertains. For example, the particular frequency of sampling may be varied from that disclosed herein. The number of cylinders, as well as the number of banks, in the engine may be varied from that disclosed here. These and all other variations which basically rely on the teachings through which this disclosure has advanced the art are properly considered within the scope of this invention.

We claim:

1. An apparatus for monitoring catalytic converter efficiency in an internal combustion engine including
   an exhaust path for an engine;
   an upstream exhaust gas oxygen sensor (EGO);
   a catalytic converter in the exhaust stream;
   a downstream exhaust gas oxygen sensor;
   switching means coupled to both said upstream exhaust gas oxygen sensor and said downstream exhaust gas oxygen sensor;
   fuel control means coupled to said switch means for causing the switch means to switch between said upstream and downstream exhaust gas oxygen sensor;
   fuel injectors coupled to said fuel control means and responsive to said control means for injecting a determined amount of fuel; and
   said fuel control means adapted to switch to said upstream exhaust gas oxygen sensor during normal air/fuel ratio control and switch to said downstream exhaust gas oxygen sensor during air/fuel control when catalytic converter efficiencies being monitored.

2. A method as recited in claim 1, wherein said fuel control means includes means for comparing a limit cycle frequency measured during the test to a maximum acceptable frequency calculated as a function of, speed-load conditions encountered during the test.

3. An apparatus as recited in claim 2, wherein said fuel control means includes means for rationalizing data by filtering out erroneous EGO switching due to cylinder air/fuel maldistribution.

4. An apparatus as recited in claim 3, further comprising means for ensuring limits on fluctuations of vehicle operating conditions, stabilizing operation using the downstream EGO control and monitoring to determine whether the measured frequency is within designated limits.

5. An apparatus for monitoring catalytic converter efficiency in an internal combustion engine including
an exhaust path for an engine;
an upstream exhaust gas oxygen sensor;
a catalytic converter in the exhaust stream;
a downstream exhaust gas oxygen sensor;
switching means coupled to both said upstream exhaust gas oxygen sensor and said downstream exhaust gas oxygen sensor;
control means coupled to said switch means for causing the switch means to switch between said upstream and downstream exhaust gas oxygen sensor;
fuel injectors coupled to said control means and responsive to said control means for injecting a determined amount of fuel;
said control means adapted to switch to said upstream exhaust gas oxygen sensor during normal air/fuel ratio control and switch to said downstream exhaust gas oxygen sensor during air/fuel control when catalytic converter efficiencies being monitored;
said fuel control means including means for comparing a limit cycle frequency measured during the test to a calculation of the maximum acceptable frequency based upon speed-load conditions encountered during the test;
means for rationalizing data by filtering out erroneous EGO switching due to cylinder air/fuel maldistribution;
means for ensuring limits on fluctuations of vehicle operating conditions, stabilizing under the downstream EGO control and monitoring to determine whether the measured frequency is within the designated limits; and
means for rationalizing data to filter out erroneous gas oxygen sensor switching due to cylinder to cylinder air/fuel maldistribution.

6. A method of monitoring catalytic converter efficiency in an engine. control having an EGO sensor upstream and another exhaust gas oxygen sensor downstream from a catalytic converter in the exhaust path from an engine including the steps of:
using a table of speed versus load indicating a threshold limit cycle frequency at each at each speed-load combination for use in accepting or rejecting a catalytic converter;
using the downstream exhaust gas oxygen sensor to control the feedback fuel control system during the catalytic converter monitor test;
comparing the limit cycle frequency measured during the test to a calculation of the maximum acceptable limit cycle frequency based on the load speed conditions encountered during the test; and
rationalizing data to filter out erroneous exhaust gas oxygen sensor switching due to cylinder to cylinder air/fuel maldistribution.

7. A method of monitoring catalytic converter efficiency as recited in claim 6 further comprising the step of:
ensuring desired limits on fluctuations of vehicle operating conditions prior to and during monitoring of catalytic converter efficiency.

8. A method of catalytic converter efficiency monitoring in a system having an exhaust gas oxygen sensor upstream and another gas oxygen sensor downstream from a catalytic converter including the steps of:
using the downstream exhaust gas oxygen sensor to control feedback fuel control system during catalytic converter monitoring; and
using a stored table of catalytic converter operating parameters for monitoring catalytic converter efficiency.

9. A method as recited in claim 8 further comprising the steps of:
using a speed-load table with limit cycle frequencies in a fuel control module;
comparing sensed limit cycle frequency data at engine speed load operating points to the stored frequency at the corresponding speed load operating points; and
determining whether to accept or reject the catalytic converter based upon the comparison of the two frequencies.

10. A method as recited in claim 9 wherein the step of comparing the sensed limit cycle frequency to the stored frequency occurs every background loop of engine control operation.

11. A method of catalytic converter efficiency monitoring in an engine control system ha exhaust gas oxygen sensor upstream and another exhaust gas oxygen sensor downstream from a catalytic converter including the steps of:
using the downstream exhaust gas oxygen sensor to control feedback fuel control system during catalytic converter monitor;
using a speed-load table with stored limit cycle frequencies;
comparing sensed limit cycle frequency data at engine speed load operating points to the stored limit cycle frequency at the corresponding speed load operating point;
determining whether to accept or reject the catalytic converter based upon the comparison of the two limit cycle frequencies;
ensuring desired limits on fluctuations of vehicle operating conditions prior to and during monitoring of catalytic converter efficiency; and
rationalizing data to filter out erroneous exhaust gas oxygen sensor switching due to cylinder to cylinder air/fuel maldistribution.

* * * * *